United States Patent
Feng

(10) Patent No.: US 10,667,183 B2
(45) Date of Patent: May 26, 2020

(54) RESOURCE CONFIGURATION METHOD FOR SWITCHING, NETWORK ACCESS POINT, AND MOBILE STATION

(71) Applicant: GUANGDONG OPPO MOBILE TELECOMMUNICATIONS CORP., LTD., Dongguan (CN)

(72) Inventor: Bin Feng, Dongguan (CN)

(73) Assignee: GUANGDONG OPPO MOBILE TELECOMMUNICATIONS CORP., LTD., Dongguan, Guangdong (CN)

( * ) Notice: Subject to any disclaimer, the term of this patent is extended or adjusted under 35 U.S.C. 154(b) by 0 days.

(21) Appl. No.: 15/775,303

(22) PCT Filed: Mar. 24, 2016

(86) PCT No.: PCT/CN2016/077254
§ 371 (c)(1),
(2) Date: May 10, 2018

(87) PCT Pub. No.: WO2017/133063
PCT Pub. Date: Aug. 10, 2017

(65) Prior Publication Data
US 2018/0332509 A1    Nov. 15, 2018

(30) Foreign Application Priority Data
Feb. 5, 2016  (WO) ............... PCT/CN2016/073675

(51) Int. Cl.
*H04W 36/00* (2009.01)
*H04W 76/27* (2018.01)
(Continued)

(52) U.S. Cl.
CPC ... *H04W 36/0072* (2013.01); *H04W 36/0016* (2013.01); *H04W 36/18* (2013.01);
(Continued)

(58) Field of Classification Search
CPC .................................................. H04W 36/0072
See application file for complete search history.

(56) References Cited

U.S. PATENT DOCUMENTS

2004/0058678 A1  3/2004  Detorbal
2007/0184838 A1  8/2007  Van Der Velde
(Continued)

FOREIGN PATENT DOCUMENTS

CN         1859784 A    11/2006
CN       101179839 A     5/2008
(Continued)

OTHER PUBLICATIONS

International Search Report in international application No. PCT/CN2016/112422, dated Mar. 8, 2017.
(Continued)

*Primary Examiner* — Chi H Pham
*Assistant Examiner* — Fahmida S Chowdhury
(74) *Attorney, Agent, or Firm* — Ladas & Parry, LLP

(57) ABSTRACT

A resource configuration method for switching, comprising: a first network access point determining configuration information for a switching resource pool with a second network access point; the first network access point sending the configuration information for the switching resource pool to a mobile station; the first network access point sending first instruction information to the mobile station, the first instruction information instructing the mobile station to communicate, using a switching resource from the switching resource pool, with at least one of the first network access point, the second network access point, and another mobile station.

20 Claims, 4 Drawing Sheets

(51) Int. Cl.
*H04W 36/18* (2009.01)
*H04W 36/32* (2009.01)
*H04W 64/00* (2009.01)
*H04W 4/02* (2018.01)
*H04W 4/40* (2018.01)

(52) U.S. Cl.
CPC ......... *H04W 36/32* (2013.01); *H04W 64/006* (2013.01); *H04W 76/27* (2018.02); *H04W 4/027* (2013.01); *H04W 4/40* (2018.02)

(56) References Cited

U.S. PATENT DOCUMENTS

| | | | |
|---|---|---|---|
| 2009/0088161 A1 | 4/2009 | Narasimha et al. | |
| 2010/0232393 A1 | 9/2010 | Shuai | |
| 2013/0028236 A1 | 1/2013 | Jung | |
| 2013/0294409 A1 | 11/2013 | Shuai et al. | |
| 2013/0294410 A1 | 11/2013 | Shuai et al. | |
| 2015/0181493 A1 | 6/2015 | Park et al. | |
| 2015/0319668 A1 | 11/2015 | Guo | |
| 2016/0037402 A1* | 2/2016 | Rosa | H04W 36/0072 370/331 |
| 2016/0330654 A1 | 11/2016 | Jung et al. | |
| 2017/0041841 A1 | 2/2017 | Pedersen et al. | |
| 2017/0215117 A1 | 7/2017 | Kwon et al. | |
| 2017/0367059 A1* | 12/2017 | Park | H04W 56/001 |
| 2018/0139651 A1* | 5/2018 | Kim | H04L 5/00 |

FOREIGN PATENT DOCUMENTS

| | | |
|---|---|---|
| CN | 101212791 A | 7/2008 |
| CN | 101273556 A | 9/2008 |
| CN | 101316436 A | 12/2008 |
| CN | 101431780 A | 5/2009 |
| CN | 102271374 A | 12/2011 |
| CN | 102625378 A | 8/2012 |
| CN | 102857980 A | 1/2013 |
| CN | 103188745 A | 7/2013 |
| CN | 104255061 A | 12/2014 |
| CN | 104521281 A | 4/2015 |
| EP | 1401229 A1 | 3/2004 |
| EP | 2728929 A1 | 5/2014 |
| JP | 2012531128 A | 12/2012 |
| JP | 5232095 B2 | 7/2013 |
| WO | 2014040245 A1 | 3/2014 |
| WO | 2014154245 A1 | 10/2014 |
| WO | 2014161161 A1 | 10/2014 |
| WO | 2015168937 A1 | 11/2015 |

OTHER PUBLICATIONS

Written Opinion of the International Search Authority in international application No. PCT/CN2016/112422, dated Mar. 8, 2017.
International Search Report in international application No. PCT/CN2016/073675, dated Oct. 25, 2016.
Written Opinion of the International Search Authority in international application No. PCT/CN2016/073675, dated Oct. 25, 2016.
International Search Report in international application No. PCT/CN2016/077254, dated Oct. 26, 2016.
Written Opinion of the International Search Authority in international application No. PCT/CN2016/077254, dated Oct. 26, 2016.
First Office Action of the Chinese application No. 201680058137.X, dated Aug. 15, 2019.
Second Office Action of the Chinese application No. 201680058137.X, dated Oct. 28, 2019.
"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 13)", 3GPP Standard; 3GPP TS 36.300, 3rd Generation Partnership Project (3GPP), Mobile Competence Centre ; 650, Route Des Lucioles; F-06921 Sophia-Antipolis Cedex; France, vol. RAN WG2, No. V13.2.0, Jan. 11, 2016 (Jan. 11, 2016), pp. 1-290.
Supplementary European Search Report in the European application No. 16889161.2, dated Feb. 11, 2019.
Supplementary European Search Report in the European application No. 16888887.3, dated Apr. 16, 2019.
English Translation of the Written Opinion of the International Search Authority in the international application No. PCT/CN2016/112422, dated Mar. 8, 2017.
English Translation of the Written Opinion of the International Search Authority in the international application No. PCT/CN2016/073675, dated Oct. 25, 2016.
English Translation of the Written Opinion of the International Search Authority in the international application No. PCT/CN2016/077254, dated Oct. 26, 2016.
First Office Action of the Japanese application No. 2018-526894, dated Feb. 4, 2020.

* cited by examiner

RESOURCE CONFIGURATION METHOD FOR SWITCHING, NETWORK ACCESS POINT, AND MOBILE STATION

RELATED APPLICATION

This application is an application under 35 U.S.C. 371 of International Application No. PCT/CN2016/077254 filed on Mar. 24, 2016, the entire contents of which are incorporated herein by reference.

TECHNICAL FIELD

Embodiments of the disclosure relate to the field of communication, and more particularly, to a resource configuration method for handover, a network Access Point (AP) and a mobile station.

BACKGROUND

An application field of a network system in the future will be extended to Vehicle to X (V2X) communication, including Vehicle to Vehicle (V2V) communication, Vehicle to Infrastructure (V2I) communication, Vehicle to Pedestrian (V2P) communication, Pedestrian to Vehicle (P2V) communication and the like.

V2X communication may effectively improve traffic efficiency, avoid traffic accidents and reduce operation risks. Researches show that V2V communication may solve about 82% of collisions without casualties and about 40% of collisions occurring at crossroads in the United States.

In a V2X communication process, a vehicle is required to keep connected with a network all the time to effectively receive information of a network side, ensure resource allocation reliability and improve data transmission efficiency. However, in some scenarios, for example, when there is no network coverage, vehicles usually communicate according to preconfigured resources, so that it is impossible to ensure ordered information interaction of a large number of connected vehicles, and resource utilization efficiency of a wireless network is reduced to a great extent. Therefore, V2X communication in the future will exist on the basis of vehicle-to-network communication in a biggest range, and it is necessary to ensure smooth connections between vehicles and networks to ensure ordered scheduling and resource allocation of the networks for the vehicles.

In such a process, a vehicle keeps moving and may be faster in some scenarios, so that how to ensure smooth and successful handover of the vehicle between different network APs becomes a key problem urgent to be solved.

A mechanism capable of ensuring handover exists in a conventional cellular network. However, there exists a longer transmission interruption delay in an existing handover flow, and a transient channel change problem for a mobile station which moves fast and the like may not be effectively solved.

SUMMARY

The embodiments of the disclosure provide a resource configuration method for handover, which may ensure normal communication of a mobile station in a handover process.

In a first aspect, there is provided a resource configuration method for handover, which may include that:

a first network AP determines handover resource pool configuration information with a second network AP;

the first network AP sends the handover resource pool configuration information to a mobile station; and the first network AP sends first indication information to the mobile station, the first indication information indicating the mobile station to communicate via a handover resource in the handover resource pool.

The mobile station in the embodiments of the disclosure may be terminal equipment in V2X, then the characteristic of predictable directionality of movement of the V2X mobile station may be utilized, a concept of handover resource is introduced, the handover resource is coordinated between the network APs in advance, and when the V2X mobile station requires handover, the handover resource may be used for handover. In such a manner, a target cell (i.e., the second network AP) may be configured before handover of the V2X mobile station, thereby reducing a handover interruption time.

In combination with the first aspect, in a first possible implementation of the first aspect, the operation that the first network AP determines the handover resource pool configuration information with the second network AP may include that: the first network AP performs coordination with the second network AP through a communication interface to determine the handover resource pool configuration information, wherein the communication interface may be an X2 interface between the first network AP and the second network AP.

In combination with the first aspect or the first possible implementation of the first aspect, in a second possible implementation of the first aspect, the operation that the first network AP sends the handover resource pool configuration information to the mobile station may include that: when the mobile terminal accesses to a the first network AP, the handover resource pool configuration information is sent to the mobile station; or after the mobile station accesses to the first network AP, the handover resource pool configuration information is sent to the mobile station; or when it is determined that the mobile station will be handed over from the first network AP to the second network AP, the handover resource pool configuration information is sent to the mobile station.

In combination with the first aspect or any possible implementation of the first aspect, in a third possible implementation of the first aspect, the operation that the first network AP sends the first indication information to the mobile station may include that: when it is determined that the mobile station will be handed over from the first network AP to the second network AP, the first indication information is sent to the mobile station.

In combination with the first aspect or any possible implementation of the first aspect, in a fourth possible implementation of the first aspect, before the operation that the first indication information is sent to the mobile station, the method may further include that: whether the mobile station will be handed over is determined according to a moving trajectory of the mobile station; or whether the mobile station will be handed over is determined according to strength of a measurement signal reported by the mobile station; or whether the mobile station will be handed over is determined according to the moving trajectory and moving speed of the mobile station.

In combination with the first aspect or any possible implementation of the first aspect, in a fifth possible implementation of the first aspect, the operation that the handover resource pool configuration information is sent to the mobile station may include that: the handover resource pool configuration information is sent to the mobile station through a system information broadcast; or the handover resource pool configuration information is sent to the mobile station through control signaling.

In combination with the first aspect or any possible implementation of the first aspect, in a sixth possible implementation of the first aspect, the method may further include that: uplink data sent by the mobile station via the handover resource is received.

In combination with the sixth possible implementation of the first aspect, in a seventh possible implementation of the first aspect, the operation that the uplink data sent by the mobile station via the handover resource is received may include that: the first network AP performs coordination with at least one other network AP to receive the uplink data sent by the mobile station via the handover resource.

Optionally, the first network AP and the at least one other network AP may use completely the same or completely different physical resource configuration information to receive the uplink data sent by the mobile station via the handover resource, wherein the at least one other network AP may include the second network AP.

In combination with the sixth or seventh possible implementation of the first aspect, in an eighth possible implementation of the first aspect, the operation that the uplink data sent by the mobile station via the handover resource is received may include that: a plurality of uplink data packets which are the same are received from the mobile station, one uplink data packet is determined to be an uplink received data packet, and uplink data in the uplink received data packet is acquired.

In combination with the first aspect or any possible implementation of the first aspect, in a ninth possible implementation of the first aspect, the method may further include that: the first network AP sends downlink data to the mobile station.

In combination with the ninth possible implementation of the first aspect, in a tenth possible implementation of the first aspect, the operation that the downlink data is sent to the mobile station may include that: the first network AP performs coordination with at least one other network AP to send the downlink data to the mobile station.

Optionally, the first network AP and the at least one other network AP may use completely the same or completely different physical resource configuration information to send the downlink data to the mobile station, wherein the at least one other network AP may include the second network AP.

In combination with the ninth or tenth possible implementation of the first aspect, in an eleventh possible implementation of the first aspect, the operation that the downlink data is sent to the mobile station may include that: a plurality of downlink data packets which are the same are sent to the mobile station to enable the mobile station to determine one of the plurality of downlink data packets as a downlink received data packet and acquire downlink data in the downlink received data packet.

In combination with the first aspect or any possible implementation of the first aspect, in a twelfth possible implementation of the first aspect, the method may further include that: the first network AP sends second indication information to the mobile station, wherein the second indication information may include at least one of: synchronization information between the first network AP and the second network AP, speed information of the mobile station or moving trajectory information of the mobile station.

In a second aspect, there is provided a resource configuration method for handover, which may include that:

a mobile station acquires handover resource pool configuration information sent by a first network AP;

the mobile station receives first indication information sent by the first network AP, the first indication information indicating the mobile station to use a handover resource in a handover resource pool; and the mobile station communicates with at least one of the first network AP, a second network AP or other mobile station via the handover resource according to the first indication information.

In combination with the second aspect, in a first possible implementation of the second aspect, the operation that the mobile station acquires the handover resource pool configuration information sent by the first network AP may include that: when the mobile terminal accesses to the first network AP, the handover resource pool configuration information sent by the first network AP is received; or after the mobile station accesses to the first network AP, the handover resource pool configuration information sent by the first network AP is received; or responsive to the condition that the mobile station will be handed over from the first network AP to the second network AP, the handover resource pool configuration information sent by the first network AP is received.

In combination with the second aspect or the first possible implementation of the second aspect, in a second possible implementation of the second aspect, the operation that the mobile station communicates with at least one of the first network AP, the second network AP or the other mobile station may include that: the mobile station sends uplink data via the handover resource to enable the first network AP and/or the second network AP to receive the uplink data.

In combination with the second aspect or any possible implementation of the second aspect, in a third possible implementation of the second aspect, the operation that the mobile station sends the uplink data via the handover resource may include that: the mobile station adopts a preset Cyclic Prefix (CP) value to send the uplink data via the handover resource to enable the uplink data to reach the first network AP and the second network AP at the same time, wherein the preset CP value may be larger than a fixed threshold value.

In combination with the second aspect or any possible implementation of the second aspect, in a fourth possible implementation of the second aspect, the operation that the mobile station communicates with at least one of the first network AP, the second network AP or the other mobile station may include that: the mobile station receives downlink data sent by the first network AP and/or the second network AP via the handover resource.

In combination with the second aspect or any possible implementation of the second aspect, in a fifth possible implementation of the second aspect, the operation that the mobile station receives the downlink data sent by the first network AP and/or the second network AP via the handover resource may include that: the mobile station receives a plurality of downlink data packets which are the same from the first network AP and/or the second network AP; one of the plurality of downlink data packets which are the same is determined to be a downlink received data packet; and downlink data in the downlink received data packet is acquired.

In combination with the second aspect or any possible implementation of the second aspect, in a sixth possible implementation of the second aspect, the operation that the mobile station communicates with at least one of the first network AP, the second network AP or the other mobile station may include that: the mobile station receives first data sent by the other mobile station via the handover resource; and/or, the mobile station sends second data to the other mobile station via the handover resource.

In combination with the second aspect or any possible implementation of the second aspect, in a seventh possible implementation of the second aspect, the method may further include that: the mobile station receives second indication information sent by the first network AP, the second indication information including at least one of: synchronization information between the first network AP and the second network AP, speed information of the mobile station or moving trajectory information of the mobile station; and the mobile station acquires uplink synchronization information of the second network AP according to the second indication information.

In a third aspect, there is provided a network AP, which is a first network AP and includes a determination unit configured to determine handover resource pool configuration information with a second network AP; and a sending unit configured to send the handover resource pool configuration information determined by the determination unit to a mobile station, wherein the sending unit is further configured to send first indication information to the mobile station and the first indication information indicating the mobile station to communicate via a handover resource in the handover resource pool. The network AP may be configured to execute each process executed by the first network AP in the method of the first aspect and the implementations thereof.

In a fourth aspect, there is provided a network AP, which includes a sender, a receiver, a processor and a memory. The network AP may be configured to execute each process executed by the first network AP in the method of the first aspect and the implementations thereof.

In a fifth aspect, there is provided a computer-readable storage medium, the computer-readable storage medium stores a program, and the program enables the network AP to execute any resource configuration method for handover in the first aspect and various implementations thereof.

In a sixth aspect, there is provided a mobile station, which includes an acquisition unit configured to acquire handover resource pool configuration information sent by a first network AP; a receiving unit configured to receive first indication information sent by the first network AP, the first indication information indicating the mobile station to use a handover resource in a handover resource pool acquired by the acquisition unit; and a communication unit configured to communicate with at least one of the first network AP, a second network AP or other mobile station via the handover resource according to the first indication information received by the receiving unit. The mobile station may be configured to execute each process executed by the mobile station in the method of the second aspect and the implementations thereof.

In a seventh aspect, there is provided a mobile station, which includes a sender, a receiver, a processor and a memory. The mobile station may be configured to execute each process executed by the mobile station in the method of the second aspect and the implementations thereof.

In an eighth aspect, there is provided a computer-readable storage medium, the computer-readable storage medium stores a program, and the program enables the mobile station to execute any resource configuration method for handover in the second aspect and various implementations thereof.

Optionally, configuration information on the handover resource in the handover resource pool may include at least one of: location information of a physical time-frequency resource block, modulation and coding scheme information, configuration information of a reference signal or antenna configuration information.

Optionally, the first indication information may be indicated by one or more reserved information bits of physical-layer control signaling; or the first indication information may be indicated by a new allocated Radio Network Temporary Identity (RNTI); or the first indication information may be indicated by a new physical-layer control signaling format.

Optionally, the control signaling or the physical-layer control signaling may be a Physical Downlink Control Channel (PDCCH).

Optionally, the first network AP may be synchronized with the second network AP, or there may be a first fixed timing offset value between the first network AP and the second network AP.

Optionally, the first network AP may be synchronized with the mobile station, or there may be a second fixed timing offset value between the first network AP and the mobile station.

BRIEF DESCRIPTION OF DRAWINGS

In order to describe the technical solutions of the embodiments of the disclosure more clearly, the drawings required to be used in the descriptions about the embodiments or a conventional art will be simply introduced below. It is apparent that the drawings described below are only some embodiments of the disclosure. Other drawings may further be obtained by those skilled in the art according to these drawings without creative work.

DETAILED DESCRIPTION

Figure 1:
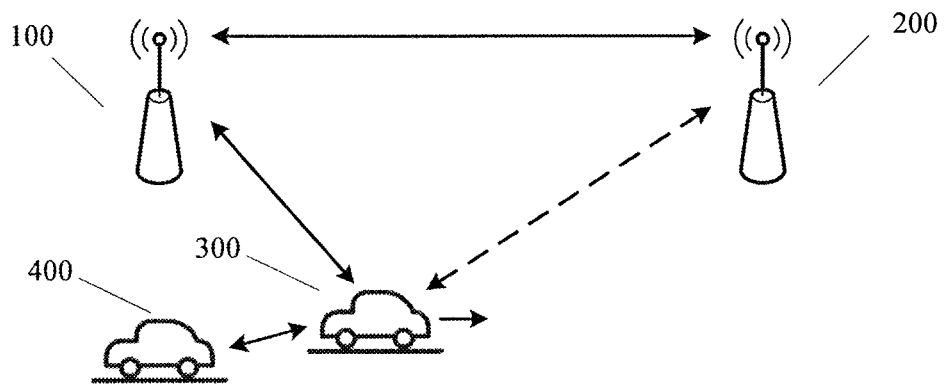
FIG. 1 is a schematic diagram illustrating a handover process of a mobile station according to an embodiment of the disclosure.

The technical solutions in the embodiments of the disclosure will be clearly and completely described below in combination with the drawings in the embodiments of the disclosure. It is apparent that the described embodiments are not all embodiments but part of embodiments of the disclosure. All other embodiments obtained by those skilled in the art on the basis of the embodiments in the disclosure without creative work shall fall within the scope of protection of the disclosure.

Various embodiments of the disclosure are described in combination with a mobile station. The mobile station may also be called as User Equipment (UE), terminal equipment, an access terminal, a user unit, a user station, a mobile radio station, a remote station, a remote terminal, mobile equipment, a user terminal, a terminal, wireless communication equipment, a user agent, a user device or the like. The mobile station may be a station in a Wireless Local Area Network (WLAN), and may be a cell phone, a cordless phone, a Session Initiation Protocol (SIP) phone, a Wireless Local Loop (WLL) station, a Personal Digital Assistant (PDA), handheld equipment with a wireless communication function, computing equipment, other processing equipment connected to a wireless modem, vehicle-mounted equipment, wearable equipment, a mobile station in a future 5th-Generation (5G) network, a mobile station in a future evolved Public Land Mobile Network (PLMN) or the like. For example, the mobile station in the embodiments of the disclosure may be an On Board Unit (OBU) mounted on a vehicle.

In addition, various embodiments of the disclosure are described in combination with network equipment. The network equipment may be equipment configured to communicate with the mobile station, and the network equipment may be an AP in the WLAN, a Base Transceiver Station (BTS) in a Global System for Mobile Communication (GSM) or Code Division Multiple Access (CDMA), may also be a NodeB (NB) in Wideband Code Division Multiple Access (WCDMA), and may further be an Evolutional Node B (eNB or eNodeB) in Long Term Evolution (LTE), or a relay station or AP, or vehicle-mounted equipment, wearable equipment, network equipment in the future 5G network, network equipment in the future evolved PLMN or the like.

In addition, various aspects or characteristics of the disclosure may be implemented as a method, a device or a product programmed with a standard and/or using an engineering technology. Term "product" used in the application covers a computer program which may be accessed from any computer-readable device, carrier or medium. For example, the computer-readable medium may include, but not limited to, a magnetic storage device (for example, a hard disk, a floppy disk or a magnetic tape), an optical disk (for example, a Compact Disk (CD) and a Digital Versatile Disk (DVD)), a smart card and a flash memory (for example, an Erasable Programmable Read-Only Memory (EPROM), a card, a stick or a key driver). In addition, various storage media described in the disclosure may represent one or more pieces of equipment and/or other machine-readable media configured to store information. Term "machine-readable medium" may include, but not limited to, a wireless channel and various other media capable of storing, including and/or bearing instructions and/or data.

FIG. 1 is a schematic diagram illustrating a handover process of a mobile station according to an embodiment of the disclosure. As illustrated in FIG. 1, a first network AP 100, a second network AP 200, a mobile station 300 and a mobile station 400 are included.

Here, the first network AP 100 and the second network AP 200 may communicate through a cellular link, and for example, communicate through a communication interface between the first network AP 100 and the second network AP 200. Here, the communication interface may be an X2 interface.

The mobile station 300 may be in a fast moving state. For example, the mobile station 300 is initially located within coverage of a network of the first network AP 100, and may directly communicate with the first network AP 100. Subsequently, the mobile station 300 moves fast and gradually enters coverage of a network of the second network AP 200. Here, the first network AP 100 may be a source base station, and the second network AP 200 may be a target base station. In this process, the mobile station 300 requires handover of a corresponding transmission resource, which may cause a longer transmission delay. Then, the mobile station 300 may not receive a resource configuration of the second network AP 200 (i.e., the target base station), thereby making it impossible for the mobile station 300 to normally receive data from or send data to an adjacent mobile station (mobile station 400 in FIG. 1).

According to the embodiment of the disclosure, the characteristic of predictability of movement of the mobile station is utilized, and a handover resource is coordinated between the network APs in advance to facilitate use of the mobile station over the handover resource in a handover process, so that a handover interruption time may be reduced, and communication of the mobile station in the handover process, including communication between the mobile station and the base stations and communication between the mobile station and other mobile station, may be ensured.

Figure 2:
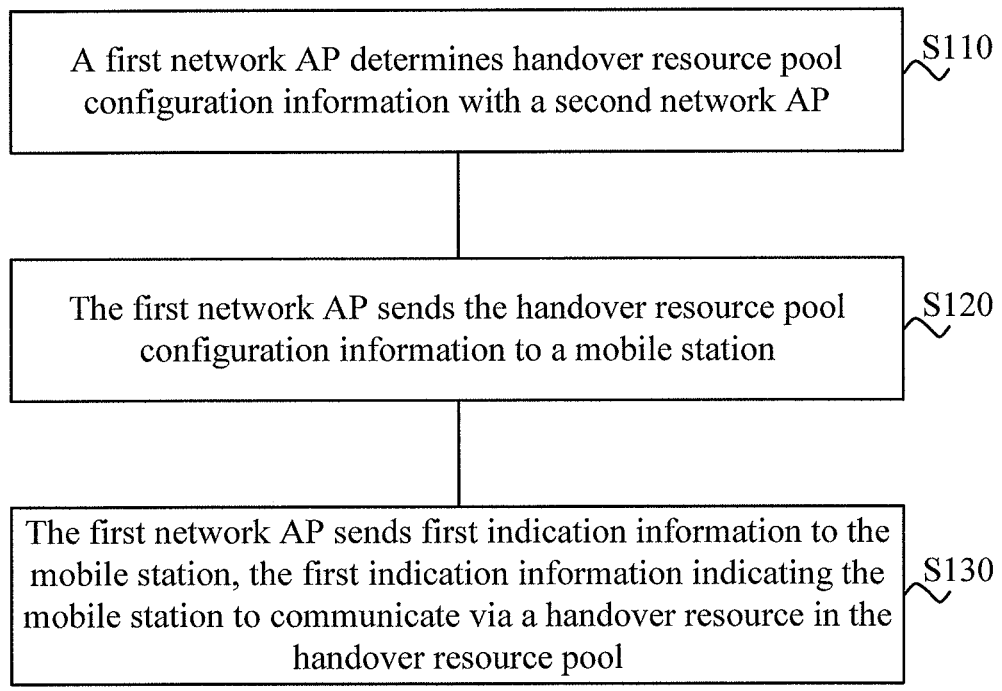
FIG. 2 is a flowchart illustrating a resource configuration method for handover according to an embodiment of the disclosure.

FIG. 2 is a flowchart illustrating a resource configuration method for handover according to an embodiment of the disclosure. The method illustrated in FIG. 2 is executed by a first network AP, and includes the following operations.

In S110, the first network AP determines handover resource pool configuration information with a second network AP.

Here, configuration information of a handover resource in a handover resource pool may include at least one of: location information of a physical time-frequency resource block, modulation and coding scheme information, configuration information of a reference signal or antenna configuration information.

The configuration information on the handover resource may further include time-frequency resource configuration information, a transmission bandwidth and the like, which will not be listed one by one herein.

It can be understood that at least one other network AP may be deployed around the first network AP, and the first network AP may directly communicate with the at least one other network AP through a communication interface (for example, an X2 interface).

As a first condition, if there is only one other network AP, i.e., the second network AP, around the first network AP, the first network AP is only required to determine the handover resource pool configuration information with the second network AP in S110.

Optionally, the first network AP may perform coordination with the second network AP through the communication interface to determine the handover resource pool configuration information.

Here, the first network AP is synchronized with the second network AP, or there is a first fixed timing offset value between the first network AP and the second network AP.

The first network AP may perform resource coordination with the second network AP to determine the handover resource pool in a negotiation manner. For example, a first handover resource pool and a second handover resource pool may be determined, wherein the first handover resource pool may subsequently be sent to the mobile station by the first network AP to enable the mobile station to use a handover resource in the first handover resource pool in a process of handover from the first network AP to the second network AP, wherein the second handover resource pool may subsequently be sent to the mobile station by the second network AP to enable the mobile station to use a handover resource in the second handover resource pool in a process of handover from the second network AP to the first network AP.

In such a manner, the handover resource used by the mobile station handed over from the first network AP to the second network AP is different from the handover resource used by the mobile station handed over from the second network AP to the first network AP as much as possible, so that a resource conflict between different mobile stations in the handover process may be avoided, resource contention may be reduced, and data transmission efficiency of the mobile station in the handover process may be ensured better.

As a second condition, if there are multiple (namely at least two) other network APs (including the second network AP) around the first network AP, the first network AP may determine handover resource pool configuration information with the multiple network APs in S110, wherein the multiple network APs include the second network AP.

Optionally, the first network AP may perform coordination with the multiple network APs through communication interfaces therebetween to determine the corresponding handover resource pool configuration information.

As an embodiment, the first network AP may determine common handover resource pool configuration information with the multiple network APs. At this moment, the first network AP determines a group of handover resource pool configuration information.

As another embodiment, the first network AP may determine handover resource pool configuration information with each network AP respectively. At this moment, the first network AP determines multiple groups of handover resource pool configuration information corresponding to the multiple network APs one to one.

It can be understood that, in the embodiment of the disclosure, the handover resource pool may include one or more different handover resources.

In S120, the first network AP sends the handover resource pool configuration information to a mobile station.

In the embodiment of the disclosure, the first network AP may send the handover resource pool configuration information to the mobile station through a system information broadcast, or the first network AP may send the handover resource pool configuration information to the mobile station through control signaling.

Here, the control signaling may be physical-layer control signaling, and for example, is a PDCCH.

Here, the first network AP is synchronized with the mobile station, or there is a second fixed timing offset value between the first network AP and the mobile station.

Optionally, as an embodiment, the handover resource pool configuration information may be sent to the mobile station when the mobile terminal accesses to the first network AP. For example, the handover resource pool configuration information may be sent to the mobile station in a process of random access of the mobile station to the first network AP.

Optionally, as another embodiment, the handover resource pool configuration information may be sent to the mobile station after the mobile station accesses to the first network AP. For example, the handover resource pool configuration information may be sent to the mobile station after the process of random access of the mobile station to the first network AP is completed.

Optionally, as another embodiment, the handover resource pool configuration information may be sent to the mobile station when it is determined that the mobile station will be handed over from the first network AP to the second network AP.

Correspondingly, it can be understood that, before S120, the first network AP determines whether the mobile station will be handed over, and for example, determines whether the mobile station will be handed over from the first network AP to the second network AP.

For example, whether the mobile station will be handed over may be determined according to strength of a measurement signal reported by the mobile station, or whether the mobile station will be handed over may be determined according to a moving trajectory of the mobile station, or whether the mobile station will be handed over may be determined according to the moving trajectory and moving speed of the mobile station.

It is to be noted that, if the multiple groups of handover resource pool configuration information corresponding to the multiple network APs one to one are determined in S110, the handover resource pool configuration information sent to the mobile station by the first network AP in S120 should further include identification information of the corresponding network APs.

Optionally, the first network AP may further send second indication information to the mobile station, and the second indication information includes at least one of: synchronization information between the first network AP and the second network AP, speed information of the mobile station or moving trajectory information of the mobile station. Here, the synchronization information includes uplink synchronization information and downlink synchronization information. Therefore, the mobile station may further determine uplink synchronization information of the second network AP after acquiring the uplink synchronization information, the downlink synchronization information, the speed information, the moving trajectory information and the like.

Here, the synchronization information between the first network AP and the second network AP may include the first timing offset value. Therefore, the mobile station may acquire synchronization information of the second network AP on the basis of the first timing offset value in the synchronization information and a synchronization relationship between the mobile station and the first network AP.

In S130, the first network AP sends first indication information to the mobile station, the first indication information indicating the mobile station to start communicating via the handover resource.

Specifically, the first indication information is configured to indicate the mobile station to communicate with at least one of the first network AP, the second network AP and other mobile station via the handover resource.

Therefore, the mobile station may communicate with at least one of the first network AP, the second network AP or the other mobile station in the process of handover from the first network AP to the second network AP via the handover resource in the handover resource pool according to the handover resource pool configuration information after receiving the first indication information.

Optionally, the first indication information may be indicated by one or more reserved information bits of the physical-layer control signaling; or the first indication information is indicated by a new allocated RNTI. Alternatively, the first indication information is indicated by a new physical-layer control signaling format.

It is to be noted that, in the embodiment of the disclosure, the reserved information bit of the physical-layer control signaling may refer to a reserved field or reserved bit which is not used and specifically defined in a physical-layer control signaling format defined in an existing protocol.

It is to be noted that, in the embodiment of the disclosure, the new physical-layer control signaling format is different from the physical-layer control signaling format defined in the existing protocol, or may also be understood as a physical-layer control signaling format redefined in a future protocol.

It is to be noted that, in the embodiment of the disclosure, the new allocated RNTI is reallocated besides existing RNTIs, and the new RNTI may be specially configured to represent the first indication information.

Therefore, the mobile station may communicate with at least one of the first network AP, the second network AP or the other mobile station via the handover resource in the handover resource pool according to the handover resource pool configuration information received in S120 after receiving the first indication information.

Optionally, the first indication information may be sent to the mobile station when it is determined that the mobile station will be handed over from the first network AP to the second network AP.

Correspondingly, it can be understood that, before S130, the first network AP determines whether the mobile station will be handed over, for example, the first network AP determines whether the mobile station will be handed over from the first network AP to the second network AP.

For example, whether the mobile station will be handed over may be determined according to the strength of the measurement signal reported by the mobile station, or whether the mobile station will be handed over may be determined according to the moving trajectory of the mobile station, or whether the mobile station will be handed over may be determined according to the moving trajectory and moving speed of the mobile station.

It is to be noted that, if the multiple groups of handover resource pool configuration information corresponding to the multiple network APs one to one are determined in S110, the multiple groups of handover resource pool configuration information and the identification information of the corresponding network APs are sent to the mobile station in S120. Then, the first indication information in S130 may include the identification information of the network APs.

For example, the first indication information may include the identification information of the second network AP. Then, after receiving the first indication information, the mobile station may determine the handover resource pool configuration information corresponding to the identification information according to the identification information of the second network AP in the first indication information and perform subsequent communication via the handover resource in the handover resource pool.

Optionally, after S130, the first network AP may receive uplink data sent by the mobile station via the handover resource.

For example, if the mobile station sends a plurality of uplink data packets which are the same via the handover resource, the first network AP may receive the plurality of uplink data packets which are the same, determine one of the plurality of uplink data packets as an uplink received data packet and acquire uplink data in the uplink received data packet.

Here, the first network AP may perform coordination with at least one other network AP to receive the uplink data sent by the mobile station via the handover resource. Here, the at least one other network AP may include the second network AP. That is, the first network AP may perform coordination with the second network AP and receive the uplink data sent by the mobile station via the handover resource.

It is to be noted that, when the first network AP performs coordinated receiving with the other network AP, locations and configurations of physical resources used when each network AP receives data packets are completely the same; or the locations and configurations of the physical resources used when each network AP receives the data packets are completely staggered. Moreover, one data packet is subsequently selected from the received data packets as a received data packet.

In a coordinated receiving process, the first network AP and the at least one other network AP may use completely the same physical resource configuration information, or the first network AP and the at least one other network AP may use completely different physical resource configuration information. Here, the at least one other network AP may include the second network AP. That is, the first network AP and the second network AP may use completely the same or completely different physical resource configuration information.

Optionally, after S130, the first network AP may send downlink data to the mobile station.

For example, the first network AP may send a plurality of downlink data packets which are the same to the mobile station to enable the mobile station to determine one of the plurality of downlink data packets as a downlink received data packet and acquire downlink data in the downlink received data packet.

Specifically, in the process of handover of the mobile station from the first network AP to the second network AP, the first network AP may send the downlink data to the mobile station. Correspondingly, the mobile station may receive the downlink data via the handover resource.

Here, the first network AP may perform coordination with at least one other network AP to send the downlink data to the mobile station. Here, the at least one other network AP may include the second network AP. That is, the first network AP may perform coordination with the second network AP to send the downlink data to the mobile station.

It is to be noted that, when the first network AP performs coordinated sending with the other network AP, each network AP sends the same data packet and uses physical resources of which locations and configurations are the same.

In a coordinated sending process, the first network AP and the at least one other network AP may use completely the same physical resource configuration information, or the first network AP and the at least one other network AP may use completely different physical resource configuration information. Here, the at least one other network AP may include the second network AP. That is, the first network AP and the second network AP may use completely the same or completely different physical resource configuration information.

Figure 3:
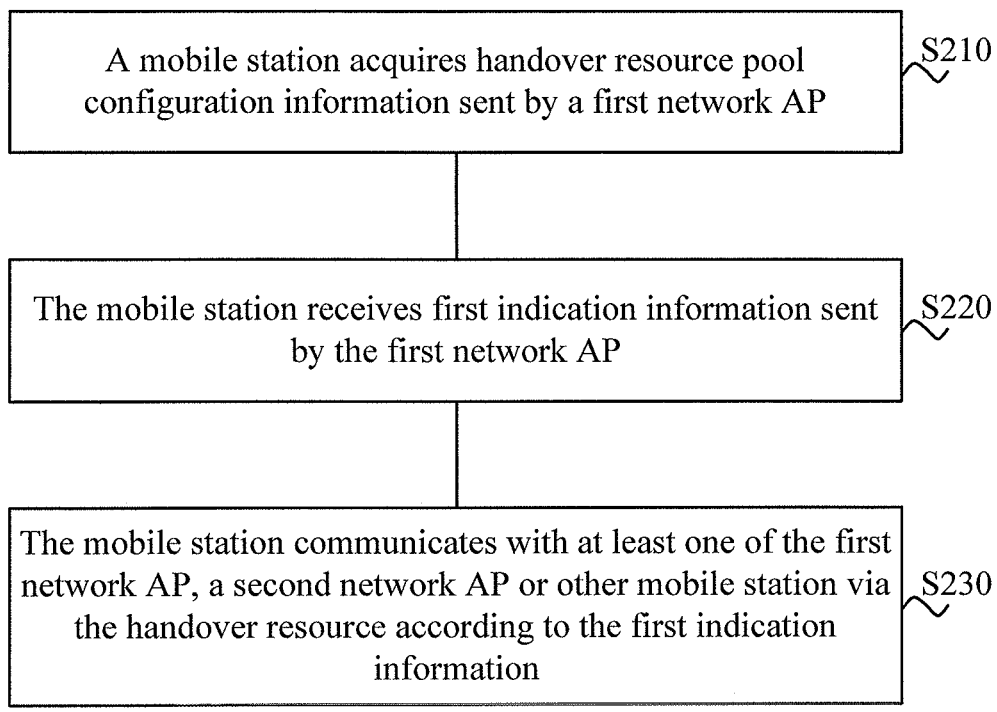
FIG. 3 is a flowchart illustrating a resource configuration method for handover according to another embodiment of the disclosure.

FIG. 3 is a flowchart illustrating a resource configuration method for handover according to another embodiment of the disclosure. The method illustrated in FIG. 3 is executed by a mobile station, and includes the following operations.

In S210, the mobile station acquires handover resource pool configuration information sent by a first network AP.

Here, configuration information of a handover resource in a handover resource pool may include at least one of: location information of a physical time-frequency resource block, modulation and coding scheme information, configuration information of a reference signal or antenna configuration information.

Optionally, the handover resource pool configuration information may be sent by the first network AP through a system information broadcast, or the handover resource pool configuration information may be sent by the first network AP through control signaling, wherein the control signaling may be physical downlink signaling, and for example, may be a PDCCH.

Here, the first network AP is synchronized with the mobile station, or there is a second fixed timing offset value between the first network AP and the mobile station.

Optionally, as an embodiment, the handover resource pool configuration information sent by the first network AP may be received when the mobile terminal accesses to the first network AP.

Optionally, as another embodiment, the handover resource pool configuration information sent by the first network AP may be received after the mobile station accesses to the first network AP.

Optionally, as another embodiment, the handover resource pool configuration information sent by the first network AP may be received responsive to the condition that the mobile station will be handed over from the first network AP to a second network AP.

S210 may refer to S120 in the embodiment of FIG. 2, and will not be elaborated herein to avoid repetitions.

In S220, the mobile station receives first indication information sent by the first network AP, the first indication information indicating the mobile station to start using a handover resource in a handover resource pool.

Optionally, the first indication information may be indicated by one or more reserved information bits of physical-layer control signaling; or the first indication information is indicated by a new allocated RNTI; or the first indication information is indicated by a new physical-layer control signaling format.

Optionally, the physical-layer control signaling may be a PDCCH.

Specifically, the first indication information sent by the first network AP is received when the mobile station will be handed over from the first network AP to the second network AP.

Optionally, the first indication information may further include identification information of the network AP corresponding to the handover resource.

S220 may refer to S130 in the embodiment of FIG. 2, and will not be elaborated herein to avoid repetitions.

Optionally, the method may further include that: the mobile station receives second indication information sent by the first network AP. The second indication information includes at least one of: synchronization information between the first network AP and the second network AP, speed information of the mobile station or moving trajectory information of the mobile station. Furthermore, the mobile station acquires uplink synchronization information of the second network AP according to the second indication information.

In S230, the mobile station communicates with at least one of the first network AP, a second network AP or other mobile station via the handover resource according to the first indication information.

Specifically, the mobile station starts using the handover resource in the handover resource pool after receiving the first indication information. It can be understood that, if the first indication information includes the identification information of the network AP, the mobile station uses the handover resource in the handover resource pool corresponding to the identification information.

For example, if the handover resource pool includes multiple handover resources, the mobile station may select one from the handover resource pool as the handover resource and communicate via the handover resource.

Optionally, the mobile station may send uplink data via the handover resource.

For example, the mobile station sends a plurality of uplink data packets which are the same via the handover resource to enable the first network AP and/or the second network AP to receive the plurality of uplink data packets which are the same, determine one of the plurality of uplink data packets as an uplink received data packet and acquire uplink data in the uplink received data packet.

As an example, the mobile station may adopt a preset CP value to send the uplink data via the handover resource to enable the uplink data to reach the first network AP and the second network AP at the same time, wherein the preset CP value is larger than a fixed threshold value.

Therefore, the mobile station may use a CP with a larger length to ensure that the uplink data reaches the first network AP and the second network AP at the same time.

Optionally, the mobile station may receive downlink data via the handover resource.

Here, the downlink data may be sent by the first network AP or the second network AP, or here, the downlink data may also be sent by the first network AP and the second network AP in a coordinated manner.

For example, the mobile station may receive a plurality of downlink data packets which are the same from the first network AP and/or the second network AP, determine one of the plurality of downlink data packets, which are the same, as a downlink received data packet and acquire downlink data in the downlink received data packet.

Communication between the mobile station and the first network AP and/or the second network AP in S230 may refer to related descriptions about communication after S130 in the embodiment of FIG. 2, and will not be elaborated herein to avoid repetitions.

Optionally, the mobile station may receive first data sent by the other mobile station via the handover resource.

Optionally, the mobile station may send second data to the other mobile station via the handover resource.

It is to be noted that the other mobile station may be terminal equipment in the vicinity of the mobile station and a number of the other mobile station is not limited herein. For example, the mobile station may be a mobile station 300 in FIG. 1, and the other mobile station may be a mobile station 400 in FIG. 1.

Communication between the mobile station and the other mobile station may be V2V communication, or may be V2P communication or may be V2I communication and the like, which will not be limited in the disclosure.

Figure 4:
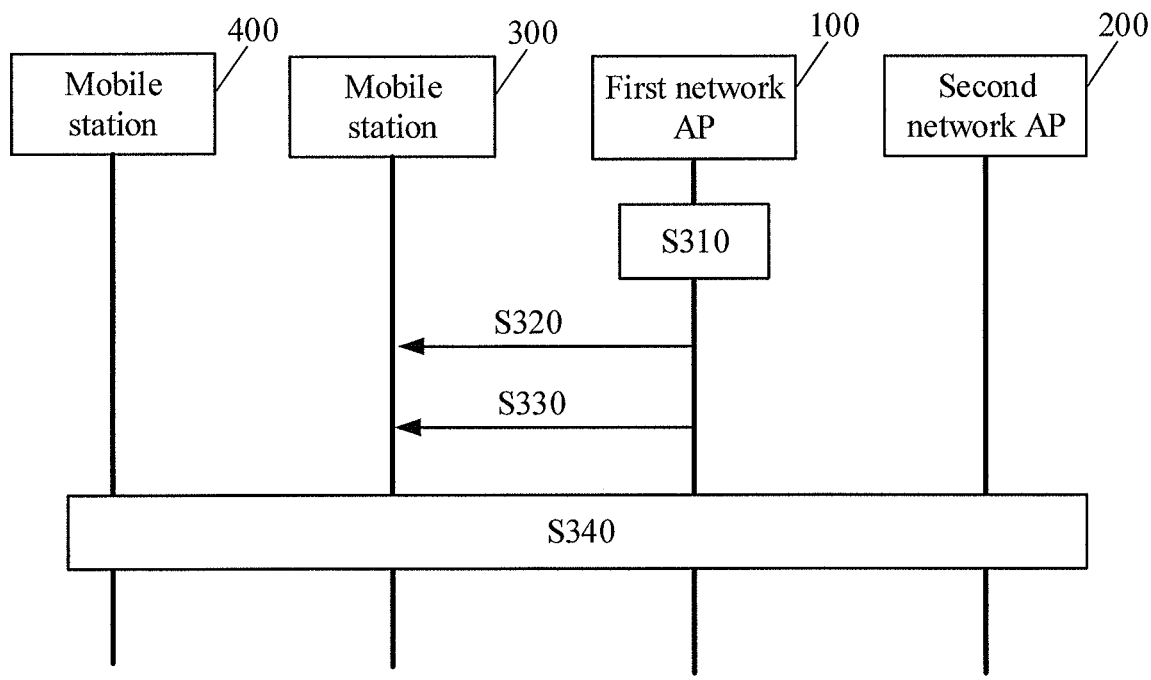
FIG. 4 is a flowchart illustrating a resource configuration method for handover according to another embodiment of the disclosure.

FIG. 4 is a flowchart illustrating a resource configuration method for handover according to another embodiment of the disclosure. A first network AP 100, a second network AP 200, a mobile station 300 and a mobile station 400 are illustrated in FIG. 4. The method illustrated in FIG. 4 includes the following operations.

In S310, the first network AP 100 determines handover resource pool configuration information with the second network AP 200.

Optionally, the first network AP may perform coordination with the second network AP through a communication interface to determine the handover resource pool configuration information.

S310 in FIG. 4 may refer to S110 in the embodiment of FIG. 2, and will not be elaborated herein to avoid repetitions.

In S320, the first network AP 100 sends the handover resource pool configuration information to the mobile station 300.

Optionally, the handover resource pool configuration information may be sent to the mobile station 300 through a system information broadcast or control signaling.

S320 in FIG. 4 may refer to S120 in the embodiment of FIG. 2 or S210 in the embodiment of FIG. 3, and will not be elaborated herein to avoid repetitions.

In S330, the first network AP 100 sends first indication information to the mobile station 300, the first indication information indicating the mobile station 300 to start using a handover resource.

Optionally, the first indication information may be sent when the mobile terminal accesses 300 to the first network AP 100, or after the mobile station accesses 300 to the first network AP 100 or when it is determined that the mobile station 300 will be handed over from the first network AP 300 to the second network AP 200.

S330 in FIG. 4 may refer to S130 in the embodiment of FIG. 3 or S220 in the embodiment of FIG. 3, and will not be elaborated herein to avoid repetitions.

In S340, the mobile station 300 performs data transmission with at least one of the first network AP 100, the second network AP 200 and the mobile station 400 via the handover resource according to the first indication information.

Optionally, the mobile station 300 may send uplink data or receive downlink data sent by the first network AP 100 and/or the second network AP 200 via the handover resource.

Optionally, the mobile station 300 may receive first data sent by the mobile station 400 via the handover resource, and/or, the mobile station 300 may send second data to the mobile station 400 via the handover resource.

S340 in FIG. 4 may refer to S230 in the embodiment of FIG. 3, and will not be elaborated herein to avoid repetitions.

Furthermore, it should be understood that, due to fast movement of the mobile station 300, the mobile station 300 may execute a random access process with the second network AP 200 and communicate according to a cellular link transmission resource allocated by the second network AP 200 after the mobile station 300 moves into coverage of a network of the second network AP 200. Moreover, the second network AP 200 may also similarly determine handover resource pool configuration information with another network AP and send the determined handover resource pool configuration information to the mobile station 300. A subsequent process is similar to a process executed by the first network AP and illustrated in FIG. 2, and will not be elaborated herein.

The mobile station in the embodiment of the disclosure may be terminal equipment in V2X, then the characteristic of predictable directionality of movement of the V2X mobile station may be utilized, a concept of handover resource is introduced, the handover resource is coordinated between the network APs in advance, and when the V2X mobile station requires handover, the handover resource may be used for handover. In such a manner, a target cell (i.e., the second network AP) may be configured before handover of the V2X mobile station, thereby reducing a handover interruption time. Communication between the mobile station and the network AP and between the mobile station and the other mobile station in the handover process may be ensured.

Figure 5:
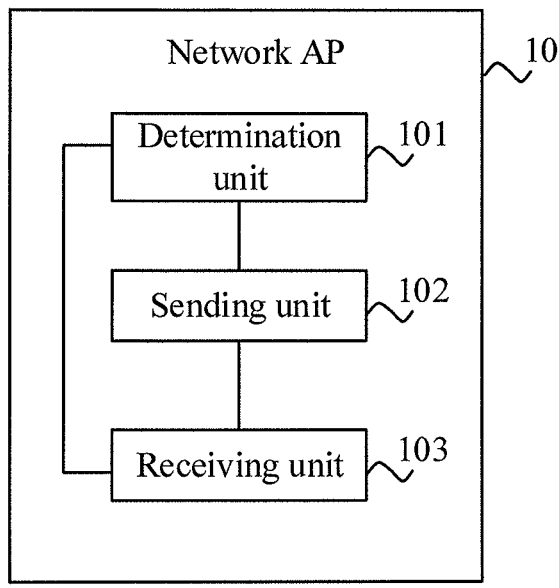
FIG. 5 is a block diagram illustrating configuration of a network AP according to an embodiment of the disclosure.

FIG. 5 is a block diagram illustrating configuration of a network AP according to an embodiment of the disclosure. The network AP 10 illustrated in FIG. 5 is a first network AP, and includes a determination unit 101, a sending unit 102 and a receiving unit 103.

The determination unit 101 is configured to determine handover resource pool configuration information with a second network AP. The sending unit 102 is configured to send the handover resource pool configuration information determined by the determination unit 101 to a mobile station. The sending unit 102 is further configured to send first indication information to the mobile station, the first indication information indicating the mobile station to communicate via a handover resource in the handover resource pool.

Here, configuration information on the handover resource in the handover resource pool includes at least one of: location information of a physical time-frequency resource block, modulation and coding scheme information, configuration information of a reference signal or antenna configuration information.

Optionally, the first indication information may be indicated by one or more reserved information bits of physical-layer control signaling; or the first indication information is indicated by a new allocated RNTI; or the first indication information is indicated by a new physical-layer control signaling format.

Here, the first network AP is synchronized with the second network AP, or there is a first fixed timing offset value between the first network AP and the second network AP.

Here, the first network AP is synchronized with the mobile station, or there is a second fixed timing offset value between the first network AP and the mobile station.

Optionally, the determination unit 101 is specifically configured to perform coordination with the second network AP through a communication interface to determine the handover resource pool configuration information, wherein the communication interface may be an X2 interface between the first network AP and the second network AP.

Optionally, the sending unit 102 is specifically configured to, when the mobile terminal accesses to the first network AP, send the handover resource pool configuration information to the mobile station; or after the mobile station accesses to the first network AP, send the handover resource pool configuration information to the mobile station; or when it is determined that the mobile station will be handed over from the first network AP to the second network AP, send the handover resource pool configuration information to the mobile station.

Here, the sending unit 102 is specifically configured to, send the handover resource pool configuration information to the mobile station through a system information broadcast, or send the handover resource pool configuration information to the mobile station through control signaling. Here, the control signaling may be physical-layer control signaling, for example, a PDCCH.

Optionally, the sending unit 102 is specifically configured to, when it is determined that the mobile station will be handed over from the first network AP to the second network AP, send the first indication information to the mobile station.

Correspondingly, the determination unit 101 is further configured to determine whether the mobile station will be handed over according to a moving trajectory of the mobile station, or determine whether the mobile station will be handed over according to strength of a measurement signal reported by the mobile station, or determine whether the mobile station will be handed over according to the moving trajectory and moving speed of the mobile station.

Furthermore, the sending unit 102 may further be configured to send downlink data to the mobile station.

Optionally, the sending unit 102 is specifically configured to perform coordination with at least one other network AP to send the downlink data to the mobile station.

Here, the at least one other network AP may include the second network AP.

Optionally, the sending unit 102 is specifically configured to use, by the first network AP and the at least one other network AP, completely the same or completely different physical resource configuration information to send the downlink data to the mobile station.

Optionally, the sending unit 102 is specifically configured to send a plurality of downlink data packets which are the same to the mobile station to enable the mobile station to determine one of the plurality of downlink data packets as a downlink received data packet and acquire downlink data in the downlink received data packet.

Furthermore, the receiving unit 103 may be configured to receive uplink data sent by the mobile station via the handover resource.

Optionally, the receiving unit 103 is specifically configured to perform coordination with at least one other network AP to receive the uplink data sent by the mobile station via the handover resource.

Optionally, the receiving unit 103 is specifically configured to use, by the first network AP and the at least one other network AP, completely the same or completely different physical resource configuration information to receive the uplink data sent by the mobile station via the handover resource.

Here, the at least one other network AP may include the second network AP.

Optionally, the receiving unit 103 is specifically configured to receive a plurality of uplink data packets which are the same from the mobile station, determine one of the plurality of uplink data packets as an uplink received data packet and acquire uplink data in the uplink received data packet.

Figure 6:
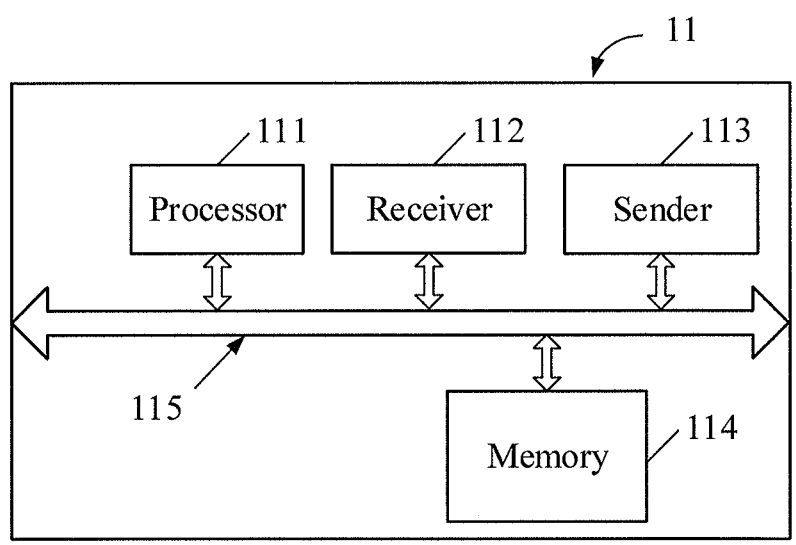
FIG. 6 is a block diagram illustrating configuration of a network AP according to another embodiment of the disclosure.

It is to be noted that, in the embodiment of the disclosure, the determination unit 101 may be implemented by a processor, the sending unit 102 may be implemented by a sender and the receiving unit 103 may be implemented by a receiver. As illustrated in FIG. 6, a network AP 11 may include a processor 111, a receiver 112, a sender 113 and a memory 114, wherein the memory 114 may be configured to store signaling, information and the like, and may also be configured to store a code executed by the processor 111 and the like.

Each component in the network AP 11 is coupled together through a bus system 115, wherein the bus system 115 includes a data bus, and further includes a power bus, a control bus and a state signal bus.

The network AP 10 illustrated in FIG. 5 or the network AP 11 illustrated in FIG. 6 may implement each process implemented by the first network AP in the method embodiments of FIG. 2 to FIG. 4, which will not be elaborated herein to avoid repetition.

Figure 7:
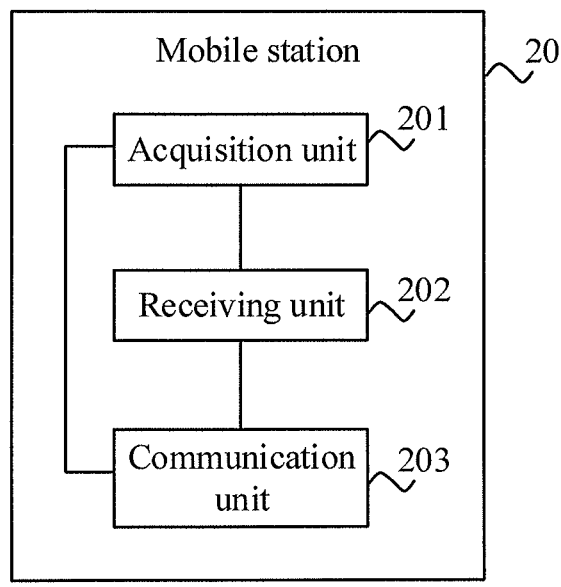
FIG. 7 is a block diagram illustrating configuration of a mobile station according to an embodiment of the disclosure.

FIG. 7 is a block diagram illustrating configuration of a mobile station according to an embodiment of the disclosure. The mobile station 20 illustrated in FIG. 7 includes an acquisition unit 201, a receiving unit 202 and a communication unit 203.

The acquisition unit 201 is configured to acquire handover resource pool configuration information sent by a first network AP.

The receiving unit 202 is configured to receive first indication information sent by the first network AP, the first indication information indicating the mobile station to use a handover resource in a handover resource pool acquired by the acquisition unit 201.

The communication unit 203 is configured to communicate with at least one of the first network AR a second network AP or other mobile station via the handover resource according to the first indication information received by the receiving unit 202.

Here, configuration information on the handover resource includes at least one of: location information of a physical time-frequency resource block, modulation and coding scheme information, configuration information of a reference signal or antenna configuration information.

The handover resource pool configuration information may be sent by the first network AP through a system information broadcast; or the handover resource pool configuration information may be sent by the first network AP through control signaling. For example, the control signaling is a PDCCH.

Optionally, the first indication information may be indicated by one or more reserved information bits of physical-layer control signaling; or the first indication information is indicated by a new allocated RNTI; or the first indication information is indicated by a new physical-layer control signaling format.

Here, the mobile station is synchronized with the first network AP, or there is a second fixed timing offset value between the mobile station and the first network AP.

Optionally, the acquisition unit 201 may include a first receiving subunit configured to, when the mobile terminal accesses to the first network AP, receive the handover resource pool configuration information sent by the first network AP; or after the mobile station accesses to the first network AP, receive the handover resource pool configuration information sent by the first network AP; or responsive to the condition that the mobile station will be handed over from the first network AP to the second network AP, receive the handover resource pool configuration information sent by the first network AP.

Optionally, the receiving unit 202 is further configured to receive second indication information sent by the first network AP, the second indication information including at least one of: synchronization information between the first network AP and the second network AP, speed information of the mobile station or moving trajectory information of the mobile station; and acquire uplink synchronization information of the second network AP according to the second indication information.

Optionally, the communication unit 203 may include a sending subunit configured to send uplink data via the handover resource to enable the first network AP and/or the second network AP to receive the uplink data.

Here, the sending subunit may specifically be configured to adopt a preset CP value to send the uplink data via the handover resource to enable the uplink data to reach the first network AP and the second network AP at the same time, wherein the preset CP value is larger than a fixed threshold value.

Optionally, the communication unit 203 may include a second receiving subunit configured to receive downlink data sent by the first network AP and/or the second network AP via the handover resource.

The communication unit 203 may further include a determination subunit and an acquisition subunit. The second receiving subunit is specifically configured to receive a plurality of downlink data packets which are the same from the first network AP and/or the second network AP. The determination subunit is configured to determine one of the plurality of downlink data packets which are the same and received by the second receiving subunit, as a downlink received data packet. The acquisition subunit is configured to acquire downlink data in the downlink received data packet determined by the determination subunit.

Optionally, the communication unit 203 may be configured to receive first data sent by the other mobile station via the handover resource; and/or, send second data to the other mobile station via the handover resource.

Figure 8:
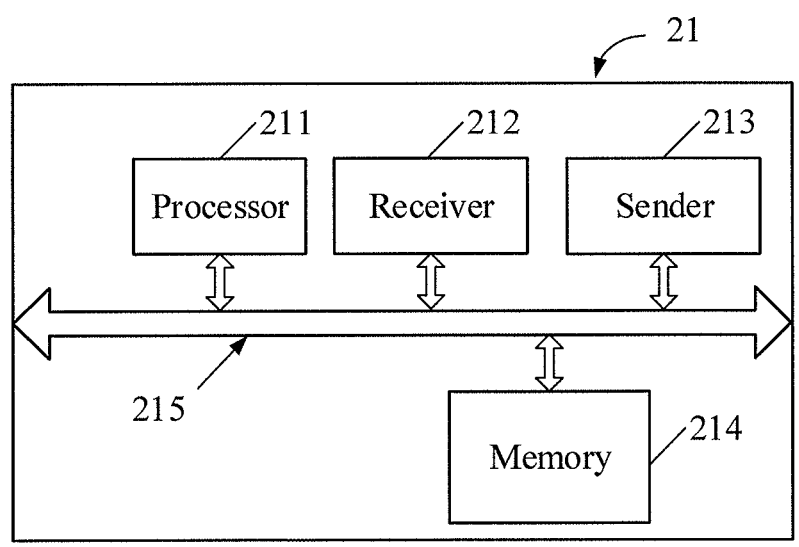
FIG. 8 is a block diagram illustrating configuration of a mobile station according to another embodiment of the disclosure.

It is to be noted that, in the embodiment of the disclosure, the acquisition unit 201, the receiving unit 202, the acquisition subunit, the first receiving subunit and the second receiving subunit may be implemented by a receiver, the communication unit 203 and the determination subunit may be implemented by a processor and the sending subunit may be implemented by a sender. As illustrated in FIG. 8, a mobile station 21 may include a processor 211, a receiver 212, a sender 213 and a memory 214, wherein the memory 214 may be configured to store signaling, information and the like, and may also be configured to store a code executed by the processor 211 and the like.

Each component in the mobile station 21 is coupled together through a bus system 215, wherein the bus system 215 includes a data bus, and further includes a power bus, a control bus and a state signal bus.

The mobile station 20 illustrated in FIG. 7 or the mobile station 21 illustrated in FIG. 8 may implement each process implemented by the mobile station in the method embodiments of FIG. 2 to FIG. 4, which will not be elaborated herein to avoid repetition.

It can be understood that the processor may be an integrated circuit chip with a signal processing capability. In an implementation process, each step of the method embodiments may be completed by an integrated logical circuit of hardware in the processor or an instruction in a software form. The processor may be a universal processor, a Digital Signal Processor (DSP), an Application Specific Integrated Circuit (ASIC), a Field Programmable Gate Array (FPGA) or another programmable logical device, discrete gate or transistor logical device and discrete hardware component. Each method, step and logical block diagram disclosed in the embodiments of the disclosure may be implemented or executed. The universal processor may be a microprocessor or the processor may also be any conventional processor and the like. The steps of the methods disclosed in combination with the embodiments of the disclosure may be directly embodied to be executed and completed by a hardware decoding processor or executed and completed by a combination of hardware and software modules in the decoding processor. The software module may be located in a mature storage medium in this field such as a Random Access Memory (RAM), a flash memory, a Read-Only Memory (ROM), a Programmable ROM (PROM) or Electrically Erasable PROM (EEPROM) and a register. The storage medium is located in a memory, and the processor reads information in the memory, and completes the steps of the methods in combination with hardware.

It can be understood that the memory in the embodiment of the disclosure may be a volatile memory or a nonvolatile memory, or may include both the volatile and nonvolatile memories, wherein the nonvolatile memory may be a ROM, a PROM, an EPROM, an EEPROM or a flash memory. The volatile memory may be a RAM, and is used as an external high-speed cache. It is exemplarily but unlimitedly described that RAMs in various forms may be adopted, such as a Static RAM (SRAM), a Dynamic RAM (DRAM), a Synchronous DRAM (SDRAM), a Double Data Rate SDRAM (DDRSDRAM), an Enhanced SDRAM (ESDRAM), a Synchlink DRAM (SLDRAM) and a Direct Rambus RAM (DR RAM). It is to be noted that the memory of a system and method described in the disclosure is intended to include, but not limited to, memories of these and any other proper types.

Those of ordinary skilled in the art may realize that the units and algorithm steps of each example described in combination with the embodiments disclosed in the disclosure may be implemented by electronic hardware or a combination of computer software and the electronic hardware. Whether these functions are executed in a hardware or software manner depends on specific applications and design constraints of the technical solutions. Professionals may realize the described functions for each specific application by virtue of different methods, but such realization shall fall within the scope of the disclosure.

Those skilled in the art may clearly learn about that specific working processes of the system, device and unit described above may refer to the corresponding processes in the method embodiment and will not be elaborated herein for convenient and brief description.

In some embodiments provided by the application, it should be understood that the disclosed system, device and method may be implemented in another manner. For example, the device embodiment described above is only schematic, and for example, division of the units is only logic function division, and other division manners may be adopted during practical implementation. For example, multiple units or components may be combined or integrated into another system, or some characteristics may be neglected or not executed. In addition, coupling or direct coupling or communication connection between each displayed or discussed component may be indirect coupling or communication connection, implemented through some interfaces, of the device or the units, and may be electrical and mechanical or adopt other forms.

The units described as separate parts may or may not be physically separated, and parts displayed as units may or may not be physical units, and namely may be located in the same place, or may also be distributed to multiple network units. Part or all of the units may be selected to achieve the purpose of the solutions of the embodiments of the disclosure according to a practical requirement.

In addition, each function unit in each embodiment of the disclosure may be integrated into a processing unit, each unit may also exist independently, and two or more than two unit may also be integrated into a unit.

When being implemented in form of software function unit and sold or used as an independent product, the function may also be stored in a computer-readable storage medium. Based on such an understanding, the technical solutions of the disclosure substantially or parts making contributions to the conventional art or part of the technical solutions may be embodied in form of software product, and the computer software product is stored in a storage medium, including a plurality of instructions configured to enable a piece of computer equipment (which may be a personal computer, a server, network equipment or the like) to execute all or part of the steps of the method in each embodiment of the disclosure. The abovementioned storage medium includes various media capable of storing program codes such as a U disk, a mobile hard disk, a ROM, a RAM, a magnetic disk or an optical disk.

The above is only the specific implementation of the disclosure and not intended to limit the scope of protection of the disclosure. Any variations or replacements apparent to those skilled in the art within the technical scope disclosed by the disclosure shall fall within the scope of protection of the disclosure. Therefore, the scope of protection of the disclosure shall be subject to the scope of protection of the claims.

The invention claimed is:

1. A resource configuration method for handover, comprising:
   determining, by a first network node, handover resource pool configuration information with a second network node;
   sending, by the first network node, the handover resource pool configuration information to a mobile station;
   sending, by the first network node, first indication information to the mobile station, the first indication information indicating the mobile station to communicate via a handover resource in the handover resource pool; and
   receiving the uplink data, which is sent by the mobile station via the handover resource,
   wherein receiving the uplink data, which is sent by the mobile station via the handover resource comprises:
   receiving a plurality of uplink data packets which are the same from the mobile station, determining one of the plurality of uplink data packets as an uplink received data packet, and acquiring uplink data in the uplink received data packet.

2. The resource configuration method as claimed in claim 1, wherein determining, by the first network node, the handover resource pool configuration information with the second network node comprises:
   performing, by the first network node, coordination with the second network node through an interface between the first network node and the second network node to determine the handover resource pool configuration information.

3. The resource configuration method as claimed in claim 1, wherein configuration information on the handover resource in the handover resource pool comprises at least one of:
   location information of a physical time-frequency resource block, modulation and coding scheme information, configuration information of a reference signal or antenna configuration information.

4. The resource configuration method as claimed in claim 1, wherein sending, by the first network node, the first indication information to the mobile station comprises:
   when it is determined that the mobile station will be handed over from the first network node to the second network node, sending the first indication information to the mobile station.

5. The resource configuration method as claimed in claim 4, wherein before sending the first indication information to the mobile station, the method further comprises:
   determining whether the mobile station will be handed over from the first network node to the second network node according to a moving trajectory of the mobile station; or
   determining whether the mobile station will be handed over from the first network node to the second network node according to strength of a measurement signal reported by the mobile station; or
   determining whether the mobile station will be handed over from the first network node to the second network node according to the moving trajectory and moving speed of the mobile station.

6. The resource configuration method as claimed in claim 1, wherein sending the handover resource pool configuration information to the mobile station comprises:
   sending the handover resource pool configuration information to the mobile station through a system information broadcast; or
   sending the handover resource pool configuration information to the mobile station through control signaling.

7. The resource configuration method as claimed in claim 1, wherein
   the first indication information is indicated by one or more reserved information bits of physical-layer control signaling; or
   the first indication information is indicated by a new allocated Radio Network Temporary Identity (RNTI); or
   the first indication information is indicated by a new physical-layer control signaling format.

8. The resource configuration method as claimed in claim 1, wherein the first network node and the at least one other network node use completely the same or completely different physical resource configuration information to receive the uplink data, which is sent by the mobile station via the handover resource.

9. The resource configuration method as claimed in claim 1, further comprising:
   sending, by the first network node, downlink data to the mobile station,
   wherein sending the downlink data to the mobile station comprises:
   performing, by the first network node, coordination with at least one other network node to send the downlink data to the mobile station.

10. The resource configuration method as claimed in claim 9, wherein the first network node and the at least one other network node use completely the same or completely different physical resource configuration information to send the downlink data to the mobile station.

11. A resource configuration method for handover, comprising:
    acquiring, by a mobile station, handover resource pool configuration information sent by a first network node;
    receiving, by the mobile station, first indication information sent by the first network node, the first indication information indicating the mobile station to use a handover resource in a handover resource pool; and
    communicating, by the mobile station, with at least one of the first network node, a second network node or other mobile station via the handover resource according to the first indication information,
    wherein communicating with at least one of the first network node, a second network node or other mobile station comprises:
    sending, by the mobile station, a plurality of uplink data packet which are the same via the handover resource, to enable the first network node to determine one of the plurality of uplink data packets as an uplink received data packet, and acquire uplink data in the uplink received data packet.

12. A mobile station, comprising: a processor;
a memory for storing a set of instructions executable by the processor; and
a receiver,
wherein the receiver is configured to: acquire handover resource pool configuration information sent by a first network node;
receive first indication information sent by the first network node, the first indication information indicating the mobile station to use a handover resource in a handover resource pool acquired by the receiver;
wherein when the instructions are executed by the processor, the processor is configured to: communicate with at least one of the first network node, a second network node or other mobile station via the handover resource according to the first indication information received by the receiver; and
wherein the sender is configured to:
send a plurality of uplink data packet which are the same via the handover resource, to enable the first network node to determine one of the plurality of uplink data packets as an uplink received data packet, and acquire uplink data in the uplink received data packet.

13. The resource configuration method as claimed in claim 1, wherein the first indication information indicates the mobile station to communicate with at least one of the first network node or the second network node via a resource in the handover resource pool.

14. The resource configuration method as claimed in claim 11, wherein configuration information on the handover resource in the handover resource pool comprises at least one of:
location information of a physical time-frequency resource block, modulation and coding scheme information, configuration information of a reference signal or antenna configuration information.

15. The mobile station as claimed in claim 12, wherein configuration information on the handover resource in the handover resource pool comprises at least one of:
location information of a physical time-frequency resource block, modulation and coding scheme information, configuration information of a reference signal or antenna configuration information.

16. The mobile station as claimed in claim 12, wherein
the handover resource pool configuration information is sent by the first network node through a system information broadcast; or
the handover resource pool configuration information is sent by the first network node through control signaling.

17. The mobile station as claimed in claim 12, wherein
the first indication information is indicated by one or more reserved information bits of physical-layer control signaling; or
the first indication information is indicated by a new allocated Radio Network Temporary Identity (RNTI); or
the first indication information is indicated by a new physical-layer control signaling format.

18. The mobile station as claimed in claim 12, further comprising a sender, wherein the sender is configured to:
send uplink data via the handover resource to enable the first network node and/or the second network node to receive the uplink data.

19. The method as claimed in claim 1, wherein sending, by the first network node, the handover resource pool configuration information to the mobile station comprises:
when the mobile station accesses to the first network node, sending the handover resource pool configuration information to the mobile station; or
after the mobile station accesses to the first network node, sending the handover resource pool configuration information to the mobile station; or
when it is determined that the mobile station will be handed over from the first network node to the second network node, sending the handover resource pool configuration information to the mobile station.

20. The mobile station as claimed in claim 12, wherein the receiver is configured to:
when the mobile station accesses to the first network node, receive the handover resource pool configuration information sent by the first network node; or
after the mobile station accesses to the first network node, receive the handover resource pool configuration information sent by the first network node; or
responsive to the condition that the mobile station will be handed over from the first network node to the second network node, receive the handover resource pool configuration information sent by the first network node.

* * * * *